Dec. 24, 1963 J. M. MURPHY 3,115,327

SEAT ADJUSTING MECHANISM

Filed Nov. 2, 1961

INVENTOR
JOHN M. MURPHY

BY

ATTORNEY

United States Patent Office 3,115,327
Patented Dec. 24, 1963

3,115,327
SEAT ADJUSTING MECHANISM
John M. Murphy, R.D. 1, Box 154B, Shamokin, Pa.
Filed Nov. 2, 1961, Ser. No. 149,569
3 Claims. (Cl. 248—397)

The present invention relates to improvements in adjustable seats for mowers, tractors and like agricultural vehicles and implements, and has for its principal object the provision of a simple and rugged construction enabling adjustable lateral tilting of the seat by the operator to maintain the seat level at such times as the supporting vehicle may be operating on a lateral slope.

A common mishap involving vehicles of the type mentioned has been their overturning while working along slopes, this usually resulting in the death or at least grievous injury of the operator. Many such mishaps have been implemented by the fact that the operator was in an inclined position, or had swung about in the seat to achieve some measure of comfort in this off-level condition, either condition being at the expense of the necessary firm control of the vehicle. All this is obviated by the present invention, which enhances both the safety and the comfort of an operator.

Applicant is aware that other patentees have sought a solution to this problem, but has observed that the prior art devices with which he is familiar necessitate a fumbling search for the seat actuating means by the operator, who should be able to give undivided attention to operation of the vehicle. Thus, in Turner Patent No. 2,519,163 which issued August 15, 1950, the operator is required to reach behind and beneath the seat to grasp a small knob in order to retract a detent before the seat can be leveled.

It is therefore another object of the invention to provide, in a seat adjusting mechanism, an actuating means that can be easily grasped by an operator without removing his eyes from the path of vehicle travel, and without the necessity of groping for such means in an inconvenient, inaccessible location.

Adjusting movement of the seat of the instant invention is achieved, as it is in most devices of the prior art, by shifting of the operator's body weight, and it is thus a still further object of the invention to provide an actuating means which, by virtue of its construction and location, will aid the operator in making the adjustment through the provision of leverage which assists in movement of the seat about its pivot axis.

An important general object of the invention is to provide a rugged supporting and adjusting mount for seats which can be economically produced and which can be installed on existing equipment without modification thereof.

Other objects and advantages of this invention will become apparent from consideration of the following description and drawings wherein, for purposes of illustration, a preferred embodiment is disclosed in detail.

Figure 1:
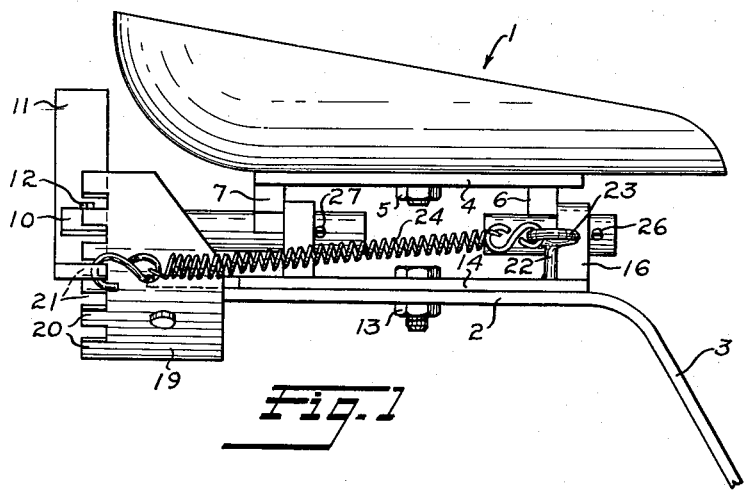
FIG. 1 is a side elevation taken from the right side of the mounting vehicle.

Referring now in detail to the drawing, the numeral 1 designates a conventional form of agricultural implement seat mounted, together with its supporting and adjusting mechanism, on the horizontal portion 2 of the usual semi-rigid seat bar 3, which is in turn secured in well known fashion atop an agricultural implement or vehicle (not shown).

Figure 2:
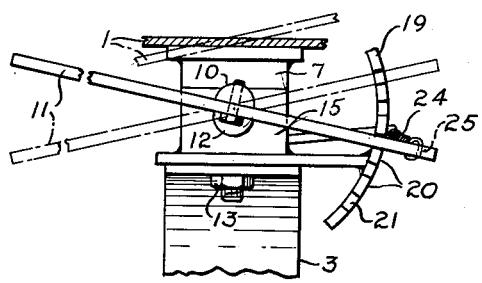
FIG. 2 is an end view taken from the left side of the vehicle of FIG. 1.
Figure 3:
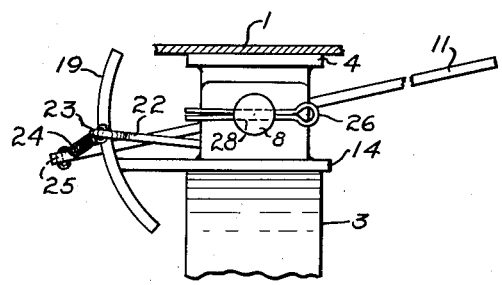
FIG. 3 is an end view taken from the right side of the vehicle of FIG. 1.
Figure 4:
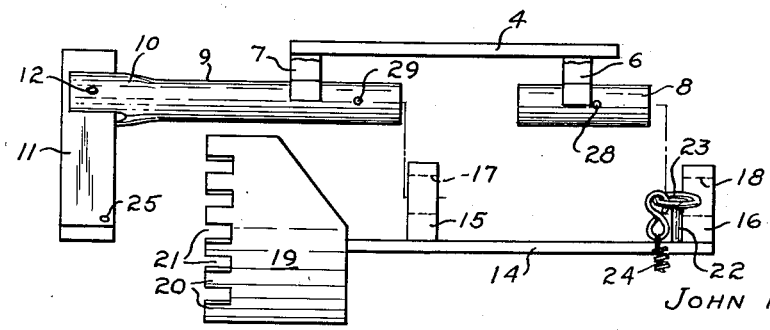
FIG. 4 is a view somewhat similar to FIG. 1, showing the improved seat adjusting mechanism in disassembled condition.

In accordance with the present invention, laterally adjustable support of seat 1 upon horizontal portion 2 of the seat bar is effected by means of a bracket 4, to which the seat may be secured as by bolt and nut 5, this bracket being provided with two downwardly extending legs 6 and 7. Integrally secured to legs 6 and 7, respectively, by welding or any other suitable means, are smooth circular pivot pins 8 and 9, these being disposed parallel to bracket 4 and in axial alignment with each other beneath the longitudinal center line of the bracket. Pin 9 is enlarged and bifurcated at one end 10, as best shown in FIG. 4, and received within the bifurcation is an adjusting lever 11, which is pivotally held in place as by bolt 12 (FIG. 2), this bolt being contained in aligned bolt poles provided in each leg of the bifurcation and in the lever 11 intermediate its ends. It will be noted that, with the bracket 4 in horizontal position, adjusting lever 11 slopes slightly upward from horizontal in a right to left direction, as viewed in FIG. 2. Also, it is to be noted with reference to FIG. 2 that the portion of the adjusting lever to the left of the pivot point is much longer than that to the right, the lefthand portion being shown as broken to indicate this.

Mounted upon portion 2 of the seat bar 3, as by bolt and nut 13, is a second bracket 14 having two upwardly extending legs 15 and 16, these being spaced apart a distance equal to the spacing of legs 6 and 7 which depend from bracket 4. Legs 15 and 16 are provided with aligned holes 17 and 18, respectively, which are adapted to pivotally receive pins 8 and 9 when the device is assembled.

At one end of bracket 14 there is integrally secured a toothed sector 19, which is in the shape of a plate bent upon a circular arc having the common axis of holes 17 and 18 as its center of curvature and being provided with teeth 20 which present between them a series of slots 21. These slots are adapted to selectively receive an end of adjusting lever 11 in a manner to be described.

Near the end of bracket 14 remote from toothed sector 19 there is rigidly secured an outstanding pin 22 having an eye 23 at its outer end. A tension spring 24, provided with hooks at its ends is adapted, with the device in assembled condition, to extend between eye 23 and a hole 25 provided near the slot-engaging end of lever 11, the lever thereby being at all times urged in an anti-clockwise direction about its pivot 12, as viewed in FIGS. 1 and 4.

To assemble the device from the condition of FIG. 4, it is only necessary to slide pins 9 and 8 as far as possible into holes 17 and 18 respectively, movement being from left to right as seen in this figure, and to attach the hooks of spring 24 to lever 11 at hole 25 and to eye 23 of pin 22. Pivot pins 8 and 9 are retained in place by cotter pins 26 and 27, which may be inserted in holes 28 and 29 provided in pins 8 and 9 respectively.

From the foregoing description, it is thought that the operation of the improved seat adjusting mechanism will be readily apparent. To adjust the seat laterally the operator need only grasp the elongated handle portion of adjusting lever 11 which is at his left side in a position giving easy access. A forward pull will rotate the lever clockwise about pivot 12 against the restraining action of spring 24 and the opposite end of lever 11 will thereupon be retracted from the slot 21 in which it was confined, and the seat may then be tilted in either lateral direction to secure the necessary adjustment. Two adjusted positions are shown, by way of example, in FIG. 2. When this has been done, release of the lever will result in engagement of the slot-engaging end thereof in the nearest slot 21, upon slight movement of the seat in either lateral direction if necessary. It is to be observed that the handle end of lever 11 is of length such as to afford substantial leverage to an operator making a seat adjustment, and there is thus provided a stabilizing effect which is nowhere to be found in the prior art devices known to applicant.

The present invention thus provides an adjusting seat mechanism having superior qualities of simplicity and ruggedness, which may be easily installed on existing equipment without modification thereof, and which promotes both the safety and the comfort of an operator.

What is claimed is:

1. A seat for an agricultural implement, vehicle or the like having
   a seat bracket including
   a horizontal portion,
   said seat comprising a seat element,
   a first bracket member secured to said seat and having front and back depending legs disposed along the longitudinal center line of the bracket,
   said depending legs being provided at their ends with axially aligned and spaced apart pivot pins disposed parallel to the plane of said bracket,
   the pin associated with said back depending leg being bifurcated at its end remote from said front leg to pivotally receive a transversely disposed adjusting lever,
   a second bracket member secured to said horizontal portion and having front and back upwardly extending legs provided with aligned holes to pivotally receive said axially aligned pins in slidably removable relationship with respect thereto so that limited rearward movement of said first bracket with respect to said second bracket will free the pivot pins from their associated holes,
   the end of said second bracket proximal said back upwardly extending leg being provided with a toothed sector having tooth slots confronting said adjusting lever at one end thereof,
   the other end of said adjusting lever constituting a handle, whereby the lever may be actuated about its pivot to retract the opposite end thereof from a selected tooth slot, enabling free lateral tilting of the seat about said pins,
   said lever end when engaged in a selected slot positively locking the seat against pivotal movement.

2. A device as claimed in claim 1, wherein
   a tension spring extending between the slot-engaging end of said adjusting lever and an anchoring means secured adjacent said front upwardly extending leg yieldingly urges said lever in a slot-engaging direction.

3. A device as claimed in claim 1, wherein
   said toothed sector is in the form of an arcuate plate formed as a segment of a cylindrical surface and having teeth and slots disposed in the direction of the cylinder axis.

References Cited in the file of this patent

UNITED STATES PATENTS

| | | |
|---|---|---|
| 1,039,004 | Young | Sept. 17, 1912 |
| 1,288,165 | Petzold | Dec. 17, 1918 |
| 2,731,074 | Steinle | Jan. 17, 1956 |